US011808564B2

(12) United States Patent
Zuo et al.

(10) Patent No.: US 11,808,564 B2
(45) Date of Patent: Nov. 7, 2023

(54) CALIBRATION METHOD FOR FRINGE PROJECTION SYSTEMS BASED ON PLANE MIRRORS

(71) Applicant: Nanjing University of Science and Technology, Jiangsu (CN)

(72) Inventors: Chao Zuo, Nanjing (CN); Wei Yin, Nanjing (CN); Qian Chen, Nanjing (CN); Shijie Feng, Nanjing (CN); Jiasong Sun, Nanjing (CN); Tianyang Tao, Nanjing (CN); Yan Hu, Nanjing (CN); Liang Zhang, Nanjing (CN); Jiaming Qian, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 9 days.

(21) Appl. No.: 17/631,542

(22) PCT Filed: Aug. 7, 2020

(86) PCT No.: PCT/CN2020/107776
§ 371 (c)(1),
(2) Date: Jan. 31, 2022

(87) PCT Pub. No.: WO2021/027719
PCT Pub. Date: Feb. 18, 2021

(65) Prior Publication Data
US 2022/0221270 A1    Jul. 14, 2022

(30) Foreign Application Priority Data
Aug. 9, 2019 (CN) .......................... 201910734477.5

(51) Int. Cl.
*G01B 11/25* (2006.01)

(52) U.S. Cl.
CPC ...... *G01B 11/2504* (2013.01); *G01B 11/2513* (2013.01); *G01B 11/2527* (2013.01)

(58) Field of Classification Search
CPC ............ G01B 11/2504; G01B 11/2513; G01B 11/2527
See application file for complete search history.

(56) References Cited

U.S. PATENT DOCUMENTS

| | | |
|---|---|---|
| 5,975,419 A | 11/1999 | Dickson et al. |
| 2003/0072011 A1* | 4/2003 | Shirley .............. G01B 11/2504 356/601 |

(Continued)

FOREIGN PATENT DOCUMENTS

| | | |
|---|---|---|
| CN | 101930628 A | 12/2010 |
| CN | 102564348 A | 7/2012 |

(Continued)

OTHER PUBLICATIONS

Almaraz-Cabral et al., "Fringe projection profilometry for panoramic 3D reconstruction", Optics and Lasers in Engineering, Nov. 3, 2015, vol. 78, pp. 106-112.

(Continued)

*Primary Examiner* — Michael P LaPage
(74) *Attorney, Agent, or Firm* — Birch, Stewart, Kolasch & Birch, LLP

(57) ABSTRACT

A calibration method for fringe projection systems based on plane mirrors. Firstly, two mirrors are placed behind the tested object. Through the reflection of mirrors, the camera can image the measured object from the front and other two perspectives, so as to obtain 360-degree two-dimensional information of the measured object. The projector projects three sets of phase-shifting fringe patterns with frequencies of 1, 8, and 64. The camera captures the fringe image to obtain an absolute phase map with a frequency of 64 by using the phase-shifting method and the temporal phase (Continued)

unwrapping algorithm. By using the calibration parameters between the projector and the camera, the absolute phase map can be converted into three-dimensional information of the measured object. Then, the mirror calibration is realized by capturing a set of 3D feature point pairs, so that the 3D information from different perspectives is transformed into a unified world coordinate system. The calibration method does not need to artificially fix the feature pattern on plane mirrors, only needs to capture a set of 3D feature point pairs by the camera to directly realize the mirror calibration that it avoids the loss of measurement accuracy and realizes high-precision panoramic three-dimensional measurement.

5 Claims, 3 Drawing Sheets

(56) References Cited

U.S. PATENT DOCUMENTS

| | | | |
|---|---|---|---|
| 2009/0238449 A1* | 9/2009 | Zhang | G06T 7/521 |
| | | | 382/165 |
| 2020/0320740 A1* | 10/2020 | McGarry | G01B 11/2522 |

FOREIGN PATENT DOCUMENTS

| | | |
|---|---|---|
| CN | 104573180 A | 4/2015 |
| CN | 105455308 A | 4/2016 |
| CN | 205505996 U | 8/2016 |
| CN | 106500596 A | 3/2017 |
| CN | 106556356 A | 4/2017 |
| CN | 109186947 A | 1/2019 |
| CN | 109253708 A | 1/2019 |
| CN | 109285213 A | 1/2019 |
| CN | 109579741 A | 4/2019 |
| CN | 110514143 A | 11/2019 |
| CN | 110672039 A | 1/2020 |
| WO | WO 2010/021972 A1 | 2/2010 |

OTHER PUBLICATIONS

Chen et al., "Mirror-assisted panoramic-digital image correlation for full-surface 360-deg deformation measurement", Measurement, Sep. 17, 2018, vol. 132, pp. 350-358.

Epstein et al.,"Exploiting Mirrors in Interactive Reconstruction with Structured Light", Proceedings of the vision, modeling, and visualization conference 2004, Nov. 18, 2004, total 8 pages.

International Search Report for PCT/CN2020/107776 dated Oct. 28, 2020.

Lanman et al., "Surround structured lighting: 3-D scanning with orthographic illumination", Computer Vision and Image Understanding, Apr. 11, 2009, vol. 113, pp. 1107-1117.

Mariottini, et al., "Planar mirrors for image-based robot localization and 3-D reconstruction", Mechatronics, Jun. 30, 2012, vol. 22, pp. 398-409.

Wu et al., "A 360° Three-Dimensional Measurement System and Its Calibration", Chinese Journal of Lasers, Apr. 2017, vol. 44, No. 4, total 9 pages.

Yin et al. "Calibration method for panoramic 3D shape measurement with plane mirrors", Optics Express, Dec. 9, 2019, vol. 27, No. 25, total 13 pages.

* cited by examiner

CALIBRATION METHOD FOR FRINGE PROJECTION SYSTEMS BASED ON PLANE MIRRORS

FIELD OF THE INVENTION

The invention belongs to the technosphere of optical measurement, in particular to a calibration method of fringe projection system based on plane mirrors.

BACKGROUND OF THE INVENTION

In recent decades, fast 3D profile measurement technology has been widely used in various fields, such as intelligent monitoring, industrial quality control, and 3D face recognition. Fringe projection profilometry based on structured light and triangulation is one of the most practical methods in 3D profile measurement because it has the advantages of non-contact, full field, high precision and high efficiency. It enables contactless and high-precision 3D imaging of objects with complex surfaces and allows high-speed measurements of dynamic scenes, such as fast-moving objects, fast-rotating or vibrating non-rigid body motions. However, in traditional measurement systems based on fringe projection profilometry (FPP) consisting of cameras and projectors, it is usually unable to obtain 360-degree 3D profile of objects with complex surfaces due to limited field of view or occlusion, which limits the potential applications of FPP. Therefore, for these problems, frequent testing must be from a different angle of view to achieve the overall shape of the object, multiple measurements must be taken from different perspectives to obtain the 360-degree profile of the object, and the existing methods can be divided into three categories: the method based on a turntable, based on the method of mobile robot, and measurement system with plane mirrors. In the method based on a turntable, the tested object is placed on the turntable and the 360-degree 3D data is obtained through multiple rotations. In contrast to the first method, the second method requires that the measurement system be mounted on a movable robotic arm to make multiple measurements around the measured object. However, point cloud registration algorithms such as iterative closest point (ICP) must be used to perform complex post-processing operations of scanned data. These fringe projection systems require multiple measurements and perform time-consuming and laborious registration algorithms, so they cannot be used for real-time 360-degree profile measurement of dynamic scenes.

Different from the first two methods, the third method is that the measurement system with mirrors can simultaneously capture the deformation fringe images of the measured object from three different perspectives, including the real camera and two virtual cameras obtained through the mirrors, so that panoramic 3D profile reconstruction can be realized through a single measurement. Epstein et al. first introduce plane mirrors into FPP to create a virtual camera and a projector (Epstein E, Granger-Piche M, Poulin P. Exploiting mirrors in interactive reconstruction with structured light. Vision, Modeling, and Visualization. 2004: 125-132). By tracking the relative positions of the camera, projector and mirror, an interactive reconstruction system with structured light can provide 3D points to accurately estimate the mirrors' posture, while reconstructing 3D data of the object. However, the system still has limitations that requires multiple measurements because the 360-degree surface of an object cannot be illuminated at the same time. To solve this problem, Lanman et al. proposed an orthogonal projection system using a DLP projector and Fresnel lens, which creates a volumetric display by illuminating a Fresnel lens (Lanman D, Crispell D, Taubin G. Surround structured lighting: 3-D scanning with orthographic illumination. Computer Vision and Image Understanding, 2009, 113(11): 1107-1117). And a unique gray code sequence is designed to establish a corresponding relation between projector and camera, recovering the dense 3D point cloud data of the tested surface. However, due to the lack of a suitable reflector model, some traditional calibration algorithms are used to obtain accurate reflector calibration results that are not only complicated but difficult to implement. For this reason, Mariottini et al. systematically studied the refraction of mirrors and proposed an ideal refraction model, which helps transform the virtual surfaces reflected by the mirrors into their true locations (Mariottini G L, Scheggi S, Morbidi F, et al. Planar mirrors for image-based robot localization and 3-D reconstruction. Mechatronics, 2012, 22(4): 398-409). Following this idea, Chen et al. prefabricated two speckle patterns on the mirrors to obtain their reflection matrixes, converting 3D information from different perspectives into a common world coordinate system, so as to realize directly full-surface 360-degree profile and deformation measurements (Chen B, Pan B. Mirror-assisted panoramic-digital image correlation for full-surface 360-deg deformation measurement. Measurement, 2019, 132: 350-358). In the method of Chen et al., in order to obtain the calibration parameters of the mirrors, they measured the 3D profile data of speckle pattern on the mirrors to obtain the reflection matrixes of the mirrors by plane fitting, so as finally achieve the calibration of the mirrors. However, the reflector calibration method proposed by Chen et al. requires that the reflector reflect belongs to the front surface, otherwise the thickness of the reflector should be considered. On the one hand, due to the uneven thickness of the printing paper with speckle patterns, it will inevitably introduce errors in the calibration process of the mirrors. On the other hand, because the paper is fixed to the mirrors, it results in a limited 3D measurement volume of the measuring systems with mirrors.

SUMMARY OF THE INVENTION

The object of the present invention is to provide a calibration method of fringe projection system based on plane mirrors. The mirror calibration is realized by capturing a group of 3D feature point pairs, so as to achieve high-precision panoramic 3D measurement.

A technical solution for achieving the object of the present invention is as follows: a calibration method of fringe projection system based on plane mirrors, and the steps are as follows:

Step 1: In a traditional measurement system based on fringe projection profilometry (FPP) consisting of a camera and a projector, a left mirror and a right mirror are placed behind the measured object. The angle between the two mirrors is about 120 degrees. Through the reflection of mirrors, the camera images the measured object from the perspective of the front, left and right mirrors, so as to obtain 360-degree two-dimensional information of the measured object.

Step 2: The projector projects three sets of phase-shifting fringe patterns to the measured object. The frequencies of three sets of phase-shifting fringe patterns are 1, 8, and 64. The projected fringe patterns are captured synchronously by the camera, and the three sets of phase-shifted fringe images are collected as the intensity map.

Step 3: For the intensity maps of three sets of phase-shifting fringe images collected in Step 2, the phase-shifting method is used to calculate the wrapped phase maps with different frequencies. Then, a multi-frequency temporal phase unwrapping algorithm is used to perform phase unwrapping on three sets of obtained wrapped phase maps in turn, and finally an absolute phase map with a frequency of 64 is obtained. By using the calibration parameters between the projector and the camera, the absolute phase map can be converted into three-dimensional information of the measured object.

Step 4: The mirror calibration is realized by capturing a set of 3D feature point pairs so that the 3D information from different perspectives is transformed into a unified world coordinate system, so as to achieve high-precision panoramic 3D measurement.

Compared with the existing technology, the invention has significant advantages: (1) the invention is a robust, efficient and high-precision calibration method, which does not need to artificially fix the feature pattern on the mirror, and only needs the camera to capture a group of 3D feature point pairs to directly realize the mirror calibration, thus indirectly avoiding the loss of measurement accuracy. (2) The calibration method of plane mirrors in the invention includes two steps: initial estimation of the reflection matrix and accurate calibration of the reflection matrix using the Levenberg-Marquardt algorithm with bundle adjustment, so as to obtain high-precision mirror calibration parameters. Experiments show that the accuracy of the panoramic 3D measurement based on the invention is about 65.122 um, so as to realize the high-precision panoramic 3D measurement.

DESCRIPTION OF THE PREFERRED EMBODIMENT

Figure 1:
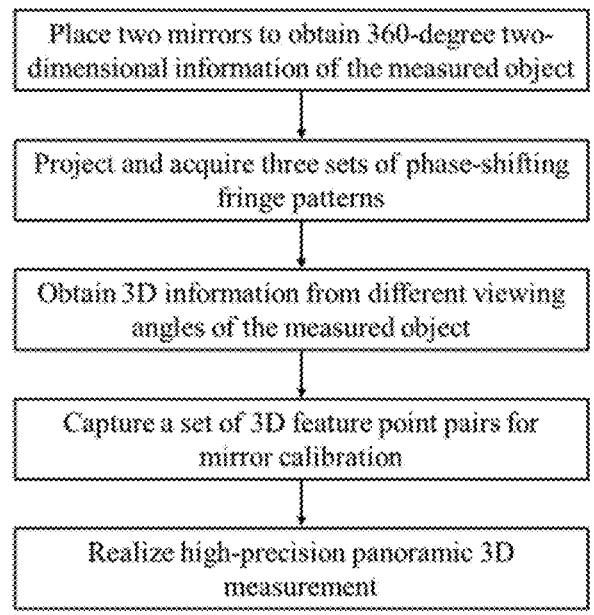
FIG. 1 is the flow chart of the calibration method of the fringe projection system based on the mirrors of the present invention.
Figure 2:
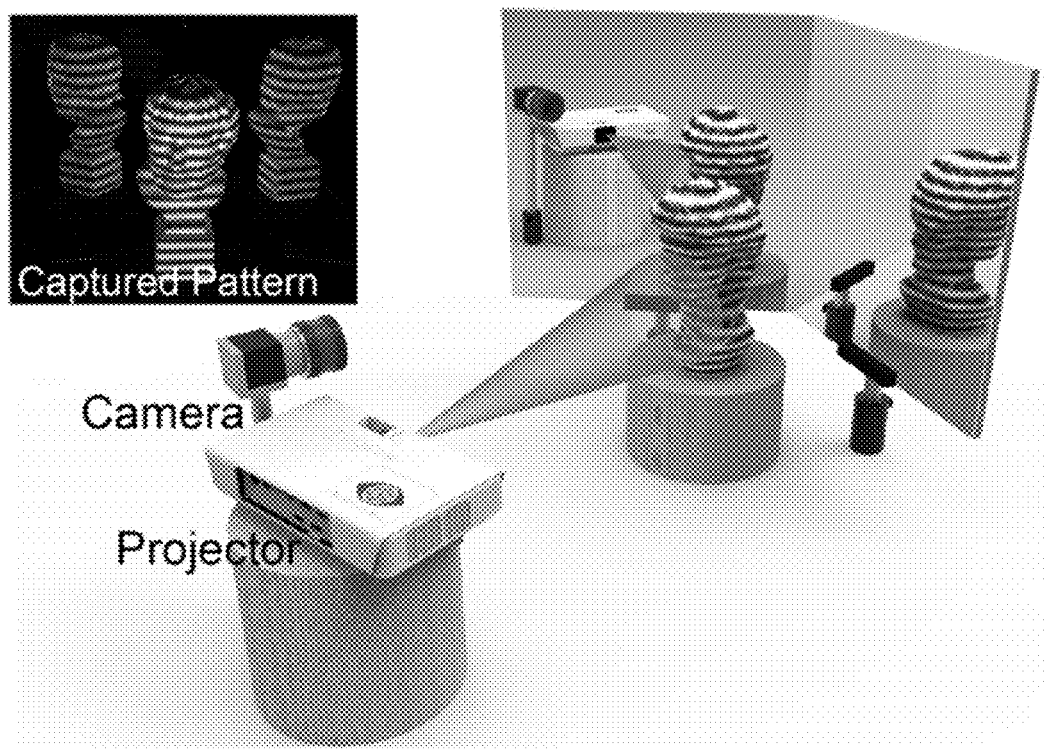
FIG. 2 is the schematic diagram of the fringe projection measurement system (3D measurement system) with mirrors of the present invention.

Referring to FIG. 1, the calibration method of the fringe projection system based on the mirrors of the invention comprises the following five steps:

Step 1: The fringe projection measurement system with mirrors is built to obtain the 360-degree 2D information of the measured object. In a traditional measurement system based on fringe projection profilometry (FPP) consisting of a camera and a projector, a left mirror and a right mirror are placed behind the measured object. The angle between the two mirrors is about 120 degrees, as shown in FIG. 2. Through the reflection of mirrors, the camera images the measured object from the perspective of the front, left and right mirrors, so as to obtain 360-degree two-dimensional information of the measured object.

Step 2: The phase-shift fringe images of the measured object is obtained. The projector projects three sets of phase-shifting fringe patterns to the measured object. The frequencies of three sets of phase-shifting fringe patterns are 1, 8, and 64. Any set of phase-shifting fringe patterns projected by the projector is represented as:

$$I_n^p(x^p, y^p) = 128 + 127\cos\left[\frac{2\pi f x^p}{W} - \frac{2\pi n}{N}\right]$$

where $I_n^p(x^p,y^p)$ is the phase-shifting fringe pattern projected by the projector, n represents the phase-shifting index of the phase-shifting fringe patterns, n=0, 1, 2, . . . , N−1, N represents the total number of phase-shifting steps, $(x^p,y^p)$ is the pixel coordinates of the projector plane, W is the horizontal resolution of the projector, f is the frequency of the phase-shifting fringe patterns. The projector projects three sets of phase-shifting fringe patterns to the measured object. The frequencies of three sets of phase-shifting fringe patterns are 1, 8, and 64. The fringe patterns within each group have the same frequency. The projected fringe patterns are captured synchronously by the camera, and the three sets of phase-shifting fringe images are collected as the intensity map, which is represented as:

$$I_n(x, y) = A(x, y) + B(x, y)\cos\left[\Phi(x, y) - \frac{2\pi n}{N}\right]$$

where $I_n(x,y)$ is the intensity map of the corresponding phase-shifting fringe image, (x,y) is the pixel coordinates of the camera plane, A(x,y) is the background intensity, B(x,y) is the modulation of the fringes, $\Phi(x,y)$ is the phase to be calculated.

Step 3: Fringe projection profilometry is used to obtain the 3D information of the measured object. For the intensity maps of three sets of phase-shifting fringe images collected in Step 2, the phase-shifting method is used to calculate the wrapped phase maps with different frequencies. Then, a multi-frequency temporal phase unwrapping algorithm is used to perform phase unwrapping on three sets of obtained wrapped phase maps in turn, and finally an absolute phase map with a frequency of 64 is obtained. By using the calibration parameters between the projector and the camera, the absolute phase map can be converted into three-dimensional information of the measured object. The specific process is as follows.

(1) The wrap phase map of the measured object is obtained, that is, the projected fringe patterns are taken synchronously by the camera in Step 2, and the intensity map of the obtained phase-shifting fringe images can be calculated by the following formula to obtain the wrapped phase map $\varphi(x,y)$:

$$\varphi(x, y) = \arctan \frac{\sum_{n=0}^{N-1} I_n(x, y)\sin\left(\frac{2\pi n}{N}\right)}{\sum_{n=0}^{N-1} I_n(x, y)\cos\left(\frac{2\pi n}{N}\right)}$$

Due to the truncation effect of the function arctan, the obtained phase map $\varphi(x,y)$ is a wrapped phase with a range of $[0, 2\pi]$, its relation to the absolute phase map $\Phi(x,y)$ is as follows:

$$\Phi(x, y) = \varphi(x, y) + 2\pi k(x, y)$$

where $k(x,y)$ is the periodic order of phase, and its range is an integer within the range of $[0, f-1]$. f is the frequency of the fringe pattern. The range of the absolute phase map with unit-frequency is $[0, 2\pi]$, so the wrapped phase map with unit-frequency is also the absolute phase map.

(2) The high-frequency absolute phase map of the measured object is obtained, and the absolute phase map is obtained by multi-frequency algorithm based on temporal phase unwrapping using the wrapped phase map with different frequencies, that is, the absolute phase map unit-frequency is used to assist the expansion of the absolute phase map with a frequency of 8, and the absolute phase map with a frequency of 8 is used to assist the expansion of the absolute phase map with a frequency of 64, as follows:

$$k_h(x, y) = \text{Round}\left(\frac{(f_h/f_l)\Phi_l(x, y) - \varphi_h(x, y)}{2\pi}\right)$$

$$\Phi_h(x, y) = \varphi_h(x, y) + 2\pi k_h(x, y)$$

where $f_h$ is the frequency of the high-frequency fringe images, $f_l$ is the frequency of the low-frequency fringe images, $\varphi_h(x,y)$ is the wrapping phase of the high-frequency fringe images, $k_h(x,y)$ is the periodic order of the phase of the high-frequency fringe images, $\Phi_h(x,y)$ and $\Phi_l(x,y)$ are the absolute phase of the high-frequency and low-frequency fringe images respectively, and Round is the rounding function.

(3) The absolute phase map is converted into the horizontal pixel coordinates of the projector to obtain the corresponding relationship between the camera and the projector. That is, when the absolute phase map $\Phi_{64}(x,y)$ with a frequency of 64 is obtained, the relationship between each pixel of the camera and the corresponding pixel in the projector can be described as follows:

$$\Phi_{64}(x, y) = \frac{2\pi f x^p}{W}$$

where W represents the horizontal resolution of the projector, f is the frequency of the absolute phase map, which is 64, $x^p$ is the horizontal pixel coordinates of the projector, $(x,y)$ and $x^p$ represent the pixel-by-pixel correspondence between the camera and the projector;

(4) After obtaining the corresponding relationship between the camera and the projector, the calibration parameters between the projector and the camera are used to obtain the 3D information of the measured object. Through system calibration, the calibration parameters of the projector and camera are obtained, and the specific formula is as follows:

$$P_c = A_c M_c = \begin{pmatrix} p_{11}^c & p_{12}^c & p_{13}^c & p_{14}^c \\ p_{21}^c & p_{22}^c & p_{23}^c & p_{24}^c \\ p_{31}^c & p_{32}^c & p_{33}^c & p_{34}^c \end{pmatrix}$$

$$P_p = A_p M_p = \begin{pmatrix} p_{11}^p & p_{12}^p & p_{13}^p & p_{14}^p \\ p_{21}^p & p_{22}^p & p_{23}^p & p_{24}^p \\ p_{31}^p & p_{32}^p & p_{33}^p & p_{34}^p \end{pmatrix}$$

where $P_c$ and $P_p$ are the calibration parameters obtained through system calibration, $A_c$ and $A_p$ are the corresponding internal parameters, $M_c$ and $M_p$ are the corresponding external parameters, $p_{ij}^c$ and $p_{ij}^p$ are the corresponding calibration elements in $P_c$ and $P_p$ respectively. Therefore, the corresponding 3D information can be obtained by the following formula:

$$\begin{pmatrix} x^w \\ y^w \\ z^w \end{pmatrix} = \begin{pmatrix} p_{11}^c - p_{31}^c x & p_{12}^c - p_{32}^c x & p_{13}^c - p_{33}^c x \\ p_{21}^c - p_{31}^c y & p_{22}^c - p_{32}^c y & p_{23}^c - p_{33}^c y \\ p_{11}^p - p_{31}^p x^p & p_{12}^p - p_{32}^p x^p & p_{13}^p - p_{33}^p x^p \end{pmatrix}^{-1} \begin{pmatrix} p_{34}^c x - p_{14}^c \\ p_{34}^c y - p_{24}^c \\ p_{34}^p x^p - p_{14}^p \end{pmatrix}$$

where $(x,y)$ is the pixel coordinate of the camera, $x^p$ is the horizontal pixel coordinate of the projector, and $(x^w, y^w, z^w)$ is the 3D information corresponding to $(x,y)$ and $x^p$, that is, the 3D information of the measured object.

Step 4: The calibration of the mirror includes four steps: in step 1, the 3D imaging model of the mirror will be reported. Based on the 3D imaging model, the virtual 3D measurement results $X^r(x^r,y^r,z^r)$ obtained from the perspectives of the left mirror and the right mirror can be transformed into the real 3D measurement results $X^o(x^o,y^o,z^o)$ in the world coordinate system, so as to realize the panoramic 3D measurement. In order to obtain the 3D imaging model, in step 2, a robust, efficient and high-precision calibration method of plane mirrors is proposed to obtain the 3D imaging model of mirror. In this method, NT 3D feature point pairs including actual points $X^o(x^o,y^o,z^o)$ and virtual points $X^r(x^r,y^r,z^r)$ are captured by the camera, which can be used to obtain the initial estimation $n^r$ and $d_w^r$ of the reflection matrix, and then the Levenberg-Marquardt algorithm with bundle adjustment is used to obtain the accurate estimation of $n^r$ and $d_w^r$ of the reflection matrix, so as to realize high-precision mirror calibration and high-precision panoramic 3D measurement. In step 3, it describes how to obtain the initial estimates of $n^r$ and $d_w^r$. In step 4, it describes how to use the Levenberg-Marquardt algorithm with bundle adjustment to obtain accurate estimation of $n^r$ and $d_w^r$ of reflection matrix, so as to realize high-precision mirror calibration. The specific process is as follows.

1. The 3D imaging model of the mirror is reported. Based on the refraction model of the mirror proposed by Mariottini et al., the 3D imaging model of the mirror can be expressed as:

$$\begin{bmatrix} I - 2n^r(n^r)^T & 2d_w^r n^r \\ 0 & 1 \end{bmatrix} \begin{bmatrix} X^r \\ 1 \end{bmatrix} = \begin{bmatrix} X^o \\ 1 \end{bmatrix}$$

$$D^r = \begin{bmatrix} I - 2n^r(n^r)^T & 2d_w^r n^r \\ 0 & 1 \end{bmatrix} \quad 5$$

where I is the identity matrix, $X^o(x^o,y^o,z^o)$ and $X^r(x^r,y^r,z^r)$ are a group of actual points and virtual points, $D^r$ is the reflection matrix of the mirror, so the calibration parameters of the mirror are $n^r$ and $d_w^r$, $n^r$ is the normal vector of the mirror, $d_w^r$ is the distance from the origin of the world coordinate system to the mirror plane. From this formula, it can be found that the 3D point cloud data obtained from the mirror can be converted to the actual world coordinate system. Based on the 3D imaging model of the mirror, if $n^r$ and $d_w^r$ are known, the 3D data of virtual points obtained from the mirror can be converted into 3D data of real points in the world coordinate system. Therefore, the key technology to realize panoramic 3D measurement is to calculate the accurate $n^r$ and $d_w^r$.

2. The mirror is calibrated. From the 3D imaging model of the mirror, it can be found that the mirror calibration can be realized by capturing a set of 3D feature point pairs by the camera. In the invention, the whole calibration process of the proposed calibration method of plane mirror includes two steps: initial estimation of the reflection matrix and accurate calibration of the reflection matrix using the Levenberg-Marquardt algorithm with bundle adjustment, so as to realize high-precision panoramic 3D measurement.

3. The initial estimates of $n^r$ and $d_w^r$ are obtained. Firstly, $N^r$ 3D feature point pairs, including actual point $X^o(x^o,y^o,z^o)$ and virtual point $X^r(x^r,y^r,z^r)$, are observed by the camera to solve the reflection matrix of the mirror. In other words, step 2 and step 3 are used to achieve 3D measurement of the measured object, so as to obtain 3D information of 3D feature point pairs. Since the actual point $X^o(x^o,y^o,z^o)$ and the virtual point $X^r$, $(x^r,y^r,z^r)$ are a pair of reflection points, due to the reflection of the mirror, the normal vector $\vec{n^r}$ is parallel to $\overrightarrow{X^oX^r}$, that is, $\vec{n^r} \times \overrightarrow{X^oX^r}=0$. Taking $n^r$ as $(a^r,b^r,c^r)$, and the initial estimation of $n^r$ can be obtained by the following formula:

$$\begin{bmatrix} y^r - y^o & x^o - x^r & 0 \\ z^r - z^o & 0 & x^o - x^r \\ 0 & z^r - z^o & y^o - y^r \end{bmatrix} \begin{bmatrix} a^r \\ b^r \\ c^r \end{bmatrix} = 0$$

where $(x^o,y^o,z^o)$ is the 3D coordinate of the actual point $X^o$ in the world coordinate system, $(x^r,y^r,z^r)$ is the 3D coordinate of the virtual point $X^r$ in the world coordinate system, and $(a^r,b^r,c^r)$ is the 3D coordinate of the normal vector $n^r$ of the mirror in the world coordinate system. The normal vector $n^r$ obtained from the above formula is a least-square problem. A more accurate solution is obtained by the SVD algorithm. The last column vector of the V matrix obtained by SVD is the initial estimate of the normal vector $n^r$, namely $(a_0^r,b_0^r,c_0^r)$.

Since the actual point $X^o(x^o,y^o,z^o)$ and virtual point $X^r(x^r,y^r,z^r)$ are symmetric about the mirror, Therefore, their midpoints must satisfy the plane equation $a_0^r x + b_0^r y + c_0^r z + d_w^r = 0$ of the mirror, and the initial estimate of $d_w^r$ can be obtained by the following formula:

$$d_w^r = -\frac{\sum_{i=1}^{N^r} \left( a_0^r \frac{x_i^o + x_i^r}{2} + b_0^r \frac{y_i^o + y_i^r}{2} + c_0^r \frac{z_i^o + z_i^r}{2} \right)}{N^r}$$

where $N^r$ is the number of 3D feature point pairs.

4. The Levenberg-Marquardt algorithm with bundle adjustment is used to calibrate the reflection matrix accurately. After obtaining the initial estimates of $n^r$ and $d_w^r$, the 3D imaging model of the mirror is rewritten into the following formula based on the Levenberg-Marquardt algorithm:

$$g_1(G) = [1 - 2(a^r)^2]x^r - 2a^r b^r y^r - 2a^r c^r z^r + 2a^r d_w^r - x^o$$

$$g_2(G) = -2a^r b^r x^r + [1 - 2(b^r)^2]y^r - 2b^r c^r z^r + 2b^r d_w^r - y^o$$

$$g_3(G) = -2a^r c^r x^r - 2b^r c^r y^r + [1 - 2(c^r)^2]z^r + 2c^r d_w^r - z^o$$

$$R(G) = \sum_{n=1}^{N^r} g_1^2(G) + g_2^2(G) + g_3^2(G)$$

where $G = \{a^r, b^r, c^r, d_w^r\}$, $g_1(G)$, $g_2(G)$ and $g_2(G)$ represent the residuals of each equation and $R(G)$ represents the sum of squares of the total residuals of the 3D imaging model of the mirror. The minimization of $R(G)$ is a nonlinear least-squares problem, which is solved by the Levenberg-Marquardt algorithm. (The Levenberg-Marquardt algorithm is a common algorithm. Generally, in order to use the Levenberg-Marquardt algorithm, the problem to be solved needs to be written into a fixed formula. The invention rewrites the 3D imaging model of the mirror into the above four formulas, and then it can be solved through the inherent solution method of the Levenberg-Marquardt algorithm). There are two key factors ($X^o$ and $X^r$) that affect the accuracy of the final optimization results. It is well known that fringe projection profilometry can realize high-precision 3D measurement of the measured object. In this system, the measurement accuracy of the actual point $X^o(x^o,y^o,z^o)$ is about 30 um. Therefore, the influence of the second factor $X^r$ should be mainly considered. In the above calibration process, the virtual point $X^r(x^r,y^r,z^r)$ is always regarded as the known input data, but the imperfect flatness and uneven reflection coefficient of the mirror lead to the low 3D measurement accuracy of the virtual point $X^r(x^r,y^r,z^r)$, which introduces the system error into the calibration of the mirror, thus obtaining calibration results with low accuracy. By further improving the manufacturing quality of the mirror, this disadvantage can be overcome to a certain extent to improve the calibration performance, but the cost is high. Therefore, the bundle adjustment method should be introduced to avoid the problem of low accuracy caused by low-quality mirrors. According to bundle adjustment, the above formula $R(G)$ can be rewritten as the following formula:

$$R(G) = \sum_{n=1}^{N^r} g_1^2(G, X_n^r) + g_2^2(G, X_n^r) + g_3^2(G, X_n^r)$$

Although the total number of variables has increased from 4 to $4+3N^r$, the minimization of $R(G)$ is still a nonlinear least-squares problem, which is solved by the Levenberg-Marquardt algorithm, so that the high-precision calibration parameters $n^r$ and $d_w^r$ are obtained, and the accurate calibration of the reflection matrix is realized.

Step 5: The 3D measurement of the measured object is realized through steps 2 and 3. The virtual 3D measurement results from the perspective of the left mirror and the perspective of the right mirror are obtained, the real 3D measurement results from the perspective of the real camera is obtained. The high-precision 3D imaging model of the mirror is obtained by using the mirror calibration parameters $n^r$ and $d_w^r$ obtained in step 4. The virtual 3D measurement results $X^r(x^r,y^r,z^r)$ obtained from the perspective of the left mirror and the right mirror are transformed into the real 3D measurement results $X^o(x^o,y^o,z^o)$ in the world coordinate system by using the 3D imaging model of the mirror, so as to realize the high-precision panoramic 3D measurement.

Example

Figure 3:
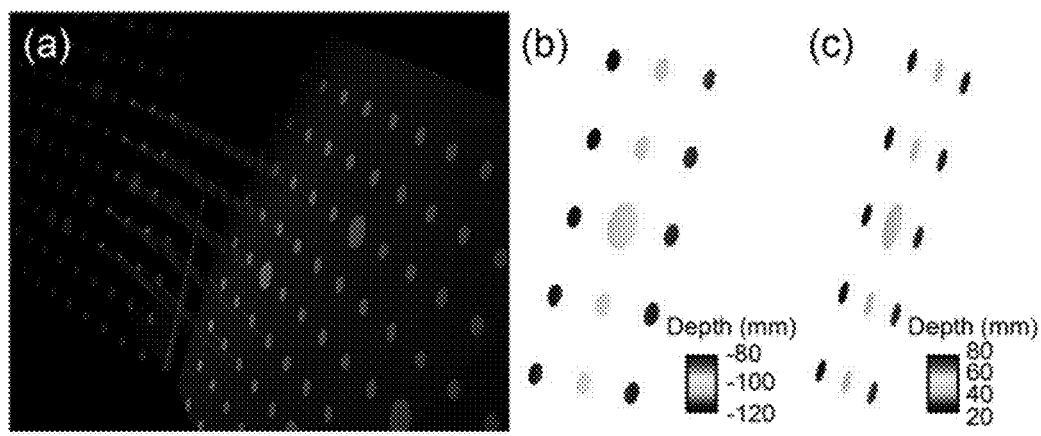
FIG. 3 is a set of 3D feature point pairs of the circle calibration plane: (a) a posture data of the circle calibration plane which can provide 15 feature point pairs. (b) 3D data of virtual points. (c) 3D data of actual points.

In order to verify the effectiveness of the method of the invention, a camera (acA2440-75 um, Basler), a projector (LightCrafter 4500PRO, TI), two front surface reflecting mirrors (30 cm×30 cm), and a computer are used to construct a 3D measuring device based on the calibration method of fringe projection system based on plane mirrors. The acquisition speed of the device for 3D measurement of objects is 25 frames per second. As described in step 1, in the traditional measurement system based on fringe projection profilometry (FPP) composed of a camera and a projector, two mirrors are placed behind the measured object, and the angle between the two mirrors is about 120-degree. Through the reflection of the mirror, the camera can image the measured object from the front and two other different perspectives (left mirror and right mirror), so as to obtain 360-degree 2D information of the measured object. As described in step 2, three groups of nine-step phase-shifting fringe patterns with different frequencies are projected and collected, and the frequencies of the three groups of fringe patterns are 1, 8, and 64 respectively. As described in step 3, three groups of wrapped phase maps with different frequencies are calculated by using the phase-shifting method. Then, the multi-frequency phase unwrapping algorithm based on temporal phase unwrapping is used to unwrap the three groups of wrapped phase maps in turn, and finally the absolute phase map with the frequency of 64 is obtained. Using the calibration parameters between the projector and the camera, the absolute phase map is transformed into the 3D information of the measured object. In step 4, the mirror calibration is realized by capturing a set of 3D feature point pairs, as shown in FIG. 3. In the process of mirror calibration, the proposed calibration method needs to capture multiple posture data of high-precision circular calibration plane (6 postures are used in this experiment), and each posture data can provide 15 feature point pairs. Then, these feature point pairs are used to successively perform the initial estimation of the reflection matrix and accurately calibrate the reflection matrix using the Levenberg-Marquardt algorithm with the bundle adjustment. In order to quantitatively analyze the robustness of the proposed calibration method, the calibration residuals of different steps are calculated, as shown in Table 1. From the comparison results in Table 1, it can be found that the proposed method can provide relatively accurate initial guesses of $n^r$ and $d_w^r$, with RMS of 0.0704 mm or 0.0611 mm. Based on these estimates, the calibration residual error can be further reduced to 0.0578 mm or 0.0534 mm by using the Levenberg-Marquardt algorithm, which proves its effectiveness. However, the low-precision 3D measurement of virtual points will introduce system errors in the calibration process, which leads to low reliability of the calibration results. Therefore, the bundle adjustment method should be introduced into the calibration method to obtain high-precision mirror calibration results, as shown in Table 1.

TABLE 1

Comparison table of calibration residuals in different steps

| RMS (mm) | Initial estimate | Levenberg-Marquardt algorithm | Levenberg-Marquardt algorithm with bundle adjustment |
|---|---|---|---|
| Left mirror | 0.0704 | 0.0578 | $1.7911 \times 10^{-5}$ |
| Right mirror | 0.0611 | 0.0534 | $1.1588 \times 10^{-5}$ |

Figure 4:
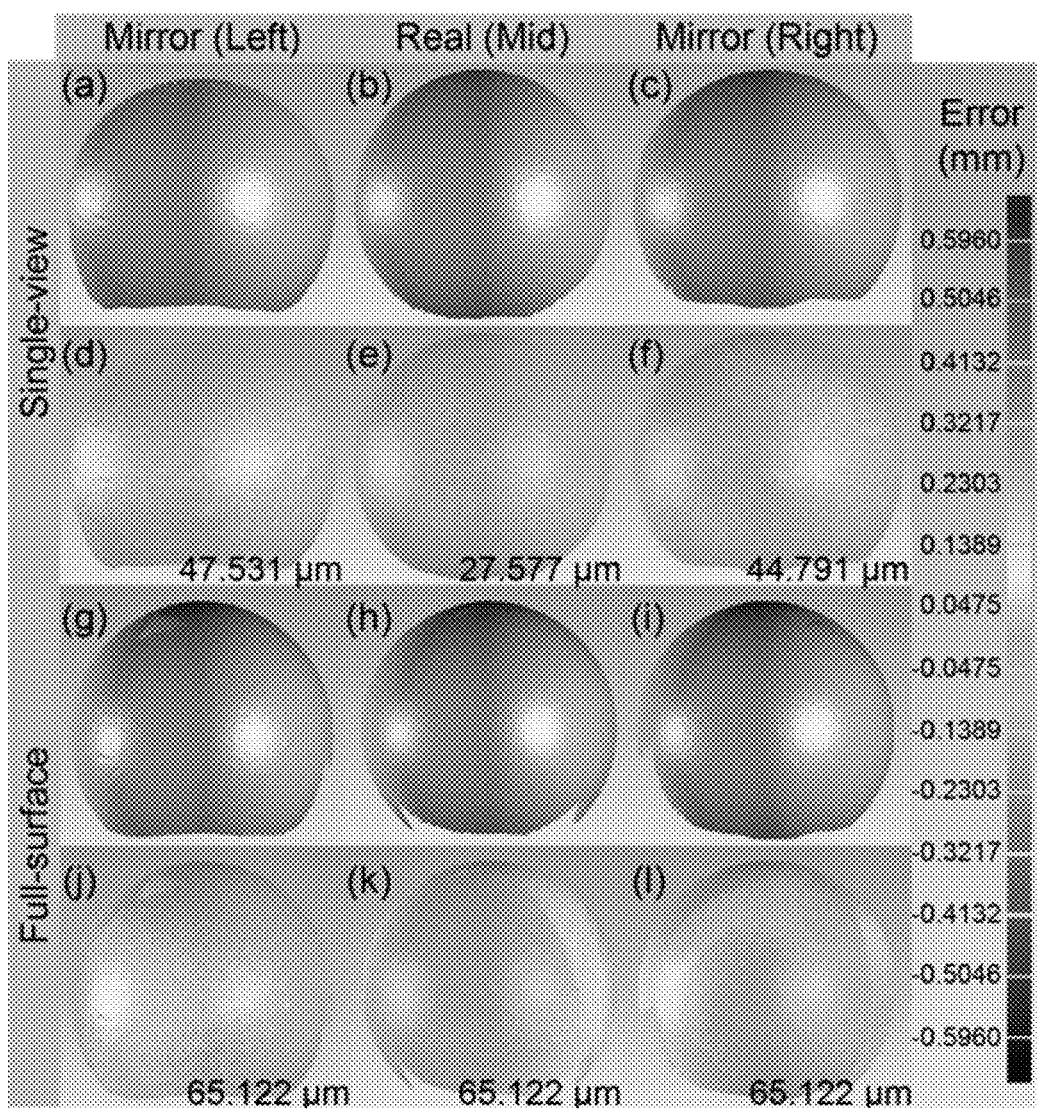
FIG. 4 shows the 3D measurement results of the standard ceramic ball: (a) the 3D measurement results obtained from the perspective of the left mirror. (b) 3D measurement results obtained from the perspective of a real camera. (c) 3D measurement results obtained from the perspective of the right mirror. (d) is the distribution of the errors of (a). (e) is the distribution of the errors of (b). (f) is the distribution of the errors of (c). (g) full-surface 3D measurement results observed from the perspective of the left mirror. (h) full-surface 3D measurement results observed from the perspective of the real cameras. (i) full-surface 3D measurement results observed from the perspective of the right mirror. (j) is the distribution of the errors of (g). (k) is the distribution of the errors of (h). (l) is the distribution of the errors of (i).

In order to further evaluate the accuracy of the proposed method, the proposed system is used to measure a standard ceramic ball with a diameter of 50.8 mm. The 3D measurement results of a single perspective and the 3D measurement results of the whole surface are shown in FIG. 4. FIG. 4 (a) shows the 3D measurement results obtained from the perspective of the left mirror, FIG. 4 (b) shows the 3D measurement results obtained from the perspective of the real camera, and FIG. 4 (c) shows the 3D measurement results obtained from the perspective of the right mirror. FIG. 4 (g) shows the full-surface 3D measurement results observed from the perspective of the left mirror, FIG. 4 (h) shows the full-surface 3D measurement results observed from the perspective of the real camera, and FIG. 4 (i) shows the full-surface 3D measurement results observed from the perspective of the right mirror. For the 3D measurement results from a single perspective, spherical fitting is performed to obtain RMS measurement errors of 27.577 um, 47.531 um and 44.791 um respectively, and the accuracy of the full-surface measurement results is 65.122 urn. FIG. 4 (d) is the distribution of the errors of FIG. 4 (a), FIG. 4 (e) is the distribution of the errors of FIG. 4 (b), and FIG. 4 (f) is distribution of the errors of FIG. 4 (c). FIG. 4 (j) is the distribution of the errors of FIG. 4 (g), FIG. 4 (k) is the distribution of the errors of FIG. 4 (h), and FIG. 4 (l) is the distribution of the errors of FIG. 4 (i). The results verify that the proposed method can achieve high-precision panoramic 3D profile measurement.

Figure 5:
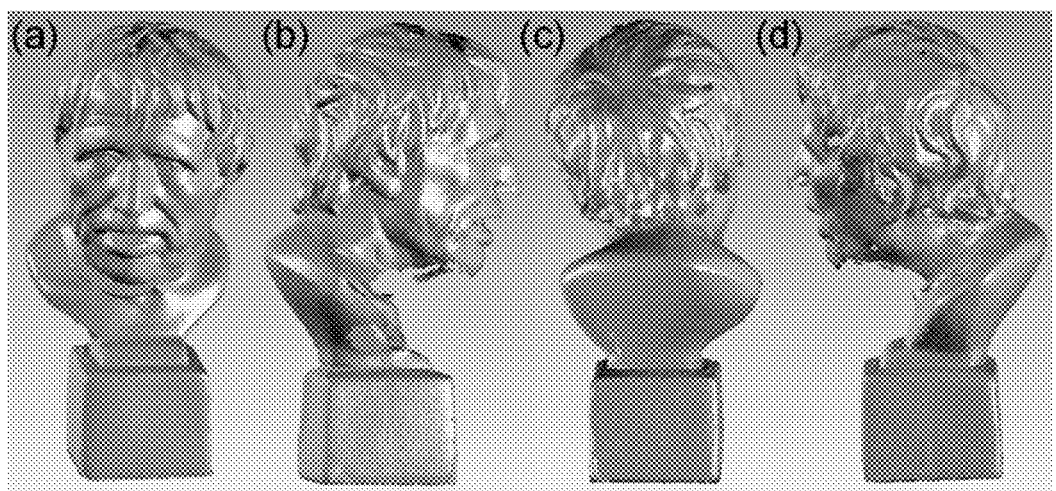
FIG. 5 shows the measurement results of Voltaire model: (a) full-surface 3D reconstruction results of Voltaire model. (b) is the full-surface 3D reconstruction result of the left perspective of (a). (c) is the full-surface 3D reconstruction result of the back perspective of (a). (d) is the full-surface 3D reconstruction result of the right perspective of (a).

Finally, the Voltaire model is measured, and the corresponding full-surface 3D reconstruction results are shown in FIG. 5. Then, the corresponding results from three different perspectives are given to illustrate the reliability of the proposed method. FIG. 5 (a) is the full-surface 3D reconstruction result of the Voltaire model, FIG. 5 (b) is the full-surface 3D reconstruction result of the left perspective of FIG. 5 (a), FIG. 5 (c) is the full-surface 3D reconstruction result of the real perspective of FIG. 5 (a), and FIG. 5 (d) is the full-surface 3D reconstruction result of the right perspective of FIG. 5 (a). Experimental results for different purposes show that this method can realize high-precision panoramic 3D profile measurement of objects with complex surfaces.

The invention claimed is:

1. A calibration method for fringe projection systems based on plane mirrors, comprising the steps of:
Step 1: placing two mirrors including a left mirror and a right mirror behind a measured object and using a camera to obtain 360-degree two-dimensional information of the measured object through reflections off the two mirrors;

Step 2: projecting three sets of phase-shifting fringe patterns to the measured object by using a projector, and capturing the projected fringe patterns synchronously with the camera and the two mirrors, wherein an intensity map is obtained for each of the three sets of phase-shifted fringe patterns;

Step 3: calculating wrapped phase maps with different frequencies by using a phase shifting method to obtain three sets of wrapped phase maps, performing phase unwrapping on the obtained three sets of wrapped phase maps, and finally obtaining an absolute phase map by using calibration parameters representing a relationship between each pixel of the projector and each pixel of the camera, and converting the absolute phase map into three-dimensional (3D) information of the measured object;

Step 4: realizing a mirror calibration for each of the two mirrors by capturing a set of 3D feature point pairs so that the 3D information of the measured object is transformed into a unified world coordinate system, so as to achieve high-precision panoramic 3D measurement.

2. The method according to claim 1 wherein the phase-shifting fringe patterns projected by the projector are represented by the following equation:

$$I_n^p(x^p, y^p) = 128 + 127\cos\left[\frac{2\pi f x^p}{W} - \frac{2\pi n}{N}\right]$$

where $I_n^p(x^p,y^p)$ is the phase-shifting fringe pattern projected by the projector, n represents a phase-shifting index of the phase-shifting fringe patterns, n=0, 1, 2, . . . , N−1, N represents a total number of phase-shifting steps, $(x^p,y^p)$ is pixel coordinates of a projector plane, W is a horizontal resolution of the projector, f is a frequency of the phase-shifting fringe patterns, and wherein the intensity map is represented by the following equation:

$$I_n(x,y)=A(x,y)+B(x,y)\cos[\Phi(x,y)-2\pi n/N]$$

where $I_n(x,y)$ is the intensity map of the corresponding phase-shifting fringe image, (x,y) is pixel coordinates of a camera plane, A(x,y) is a background intensity, B(x,y) is a modulation of fringes, $\Phi(x,y)$ is a phase to be calculated.

3. The method according to claim 1, wherein the step 3 comprises the sub-steps of:

(1) obtaining the wrapped phase map $\varphi(x,y)$ by using the following formula:

$$\varphi(x, y) = \arctan\frac{\sum_{n=0}^{N-1} I_n(x, y)\sin\left(\frac{2\pi n}{N}\right)}{\sum_{n=0}^{N-1} I_n(x, y)\cos\left(\frac{2\pi n}{N}\right)}$$

wherein the obtained phase map $\varphi(x,y)$ is a wrapped phase with a range of $[0,2\pi]$, and the absolute phase map $\Phi(x,y)$ is represented by the following equation:

$$\Phi(x, y) = \varphi(x, y) + 2\pi k(x, y)$$

where k(x,y) is a periodic order of phase, and a range thereof is an integer within a range of [0, f−1]; f is a frequency of the fringe pattern; a range of the absolute phase map with unit-frequency is $[0,2\pi]$;

(2) obtaining a high-frequency absolute phase map of the measured object by multi-frequency algorithm based on temporal phase unwrapping using the wrapped phase maps with different frequencies, the high-frequency absolute phase map is represented by the following equation:

$$k_h(x, y) = \text{Round}\left(\frac{(f_h/f_l)\Phi_l(x, y) - \varphi_h(x, y)}{2\pi}\right)$$

$$\Phi_h(x, y) = \phi_h(x, y) + 2\pi k_h(x, y)$$

where $f_h$ is a frequency of high-frequency fringe images, $f_l$ is a frequency of low-frequency fringe images, $\varphi_h(x,y)$ is a wrapping phase of the high-frequency fringe images, $k_h(x,y)$ is a periodic order of a phase of the high-frequency fringe images, $k_h(x,y)$ and $\varphi_h(x,y)$ are absolute phase of the high-frequency and low-frequency fringe images respectively, and Round is a rounding function;

(3) converting the absolute phase map into horizontal pixel coordinates of the projector to obtain the relationship between each pixel of the camera and the corresponding pixel in the projector, wherein the relationship is represented by the following equation:

$$\Phi_{64}(x, y) = \frac{2\pi f x^p}{W}$$

where W represents a horizontal resolution of the projector, f is a frequency of the absolute phase map, $x^p$ is a horizontal pixel coordinates of the projector, (x,y) and $x^p$ represent a pixel-by-pixel correspondence between the camera and the projector;

(4) obtaining the 3D information of the measured object after obtaining the corresponding relationship between the camera and the projector by using the calibration parameters between the projector and the camera, wherein the calibration parameters are represented by the following equations:

$$P_c = A_c M_c = \begin{pmatrix} p_{11}^c & p_{12}^c & p_{13}^c & p_{14}^c \\ p_{21}^c & p_{22}^c & p_{23}^c & p_{24}^c \\ p_{31}^c & p_{32}^c & p_{33}^c & p_{34}^c \end{pmatrix}$$

$$P_p = A_p M_p = \begin{pmatrix} p_{11}^p & p_{12}^p & p_{13}^p & p_{14}^p \\ p_{21}^p & p_{22}^p & p_{23}^p & p_{24}^p \\ p_{31}^p & p_{32}^p & p_{33}^p & p_{34}^p \end{pmatrix}$$

where $P_c$ and $P_p$ are calibration parameters obtained through system calibration, $A_c$ and $A_p$ are corresponding internal parameters, $M_c$ and $M_p$ are corresponding external parameters, $p_{ij}^c$ and $p_{ij}^p$ are corresponding calibration elements in $P_c$ and $P_p$ respectively, and wherein the 3D information is obtained by the following formula:

$$\begin{pmatrix} x^w \\ y^w \\ z^w \end{pmatrix} = \begin{pmatrix} p_{11}^c - p_{31}^c x & p_{12}^c - p_{32}^c x & p_{13}^c - p_{33}^c x \\ p_{21}^c - p_{31}^c y & p_{22}^c - p_{32}^c y & p_{23}^c - p_{33}^c y \\ p_{11}^p - p_{31}^p x^p & p_{12}^p - p_{32}^p x^p & p_{13}^p - p_{33}^p x^p \end{pmatrix}^{-1} \begin{pmatrix} p_{34}^c x - p_{14}^c \\ p_{34}^c y - p_{24}^c \\ p_{34}^p x^p - p_{14}^p \end{pmatrix}$$

where (x,y) is a pixel coordinate of the camera, $x^p$ is the horizontal pixel coordinate of the projector, and ($x^w$, $y^w$, $z^w$) is 3D information corresponding to (x,y) and $x^p$, being the 3D information of the measured object.

4. The method according to claim 1, wherein the mirror calibration in the step 4 comprises the subs-steps of:

(1) expressing a 3D imaging model of the mirror by the following equation:

$$\begin{bmatrix} I - 2n^r(n^r)^T & 2d_w^r n^r \\ 0 & 1 \end{bmatrix} \begin{bmatrix} X^r \\ 1 \end{bmatrix} = \begin{bmatrix} X^o \\ 1 \end{bmatrix}$$

$$D^r = \begin{bmatrix} I - 2n^r(n^r)^T & 2d_w^r n^r \\ 0 & 1 \end{bmatrix}$$

where I is a identity matrix, $X^o(x^o,y^o,z^o)$ and $X^r(x^r,y^r,z^r)$ are a group of actual points and virtual points, $D^r$ is a reflection matrix of the mirror, the calibration parameters of the mirror are $n^r$ and $d_w^r$, $n^r$ is a normal vector of the mirror, $d_w^r$ is a distance from an origin of the world coordinate system to a mirror plane;

(2) observing $N^r$ 3D feature point pairs, including actual point $X^o(x^o,y^o,z^o)$ and virtual point $X^r(x^r,y^r,z^r)$ by the camera to solve a reflection matrix of the mirror, wherein the step 2 and the step 3 are used to achieve 3D measurement of the measured object, so as to obtain the 3D information of 3D feature point pairs; since the actual point $X^o(x^o,y^o,z^o)$ and the virtual point $X^r(x^r,y^r,z^r)$ are a pair of reflection points, due to reflection of the mirror, the normal vector $\vec{n^r}$ is parallel to $\overrightarrow{X^oX^r}$, that is, $\vec{n^r} \times \overrightarrow{X^oX^r}=0$; taking $n^r$ as $(a^r,b^r,c^r)$, and an initial estimation of $n^r$ is obtained by the following formula:

$$\begin{bmatrix} y^r - y^o & x^o - x^r & 0 \\ z^r - z^o & 0 & x^o - x^r \\ 0 & z^r - z^o & y^o - y^r \end{bmatrix} \begin{bmatrix} a^r \\ b^r \\ c^r \end{bmatrix} = 0$$

where $(x^o,y^o,z^o)$ is a 3D coordinate of the actual point $X^o$ in the world coordinate system, $(x^r,y^r,z^r)$ is a 3D coordinate of the virtual point $X^r$ in the world coordinate system, and $(a^r,b^r,c^r)$ is a 3D coordinate of the normal vector $n^r$ of the mirror in the world coordinate system; and (3) after obtaining initial estimates of $n^r$ and $d_w^r$, rewriting the 3D imaging model of the mirror into the following formula based on Levenberg-Marquardt algorithm:

$$g_1(G) = \left[1 - 2(a^r)^2\right]x^r - 2a^r b^r y^r - 2a^r c^r z^r + 2a^r d_w^r - x^o$$

$$g_2(G) = -2a^r b^r x^r + \left[1 - 2(b^r)^2\right]y^r - 2b^r c^r z^r + 2b^r d_w^r - y^o$$

$$g_3(G) = -2a^r c^r x^r - 2b^r c^r y^r + \left[1 - 2(c^r)^2\right]z^r + 2c^r d_w^r - z^o$$

$$R(G) = \sum_{n=1}^{N^r} g_1^2(G) + g_2^2(G) + g_3^2(G)$$

where $G=\{a^r,b^r,c^r,d_w^r\}$, $g_1(G)$, $g_2(G)$ and $g_2(G)$ represent residuals of each equation and R(G) represents a sum of squares of total residuals of the 3D imaging model of the mirror; a minimization of R(G) is a nonlinear least-squares problem, which is solved by the Levenberg-Marquardt algorithm.

5. The method according to claim 4, wherein the 3D information includes 3D measurement of the measured object which is achieved through the step 2 and the step 3; virtual 3D measurement results which are obtained from a perspective of the left mirror and right mirror, real 3D measurement results which is obtained from a perspective of a real camera; and mirror calibration parameters $n^r$ and $d_w^r$ which are used to obtain the 3D imaging model of each mirror, and wherein according to the 3D imaging model of each mirror, the virtual 3D measurement results $X^r(x^r,y^r,z^r)$ obtained from the perspectives of the left mirror and the right mirror are respectively converted to the real 3D measurement results $X^o(x^o,y^o,z^o)$ in the world coordinate system, so as to realize the high-precision panoramic 3D measurement.

\* \* \* \* \*